United States Patent [19]

Bagshaw et al.

[11] Patent Number: 4,945,539
[45] Date of Patent: Jul. 31, 1990

[54] ACOUSTO-OPTIC TUNABLE FILTER

[75] Inventors: John M. Bagshaw; Lionel W. J. Kent; Terence F. Willats, all of Chelmsford; Steven J. Payne, Basildon, all of United Kingdom

[73] Assignee: The General Electric Company, p.l.c., London, United Kingdom

[21] Appl. No.: 309,522

[22] Filed: Feb. 13, 1989

[30] Foreign Application Priority Data

Feb. 17, 1988 [GB] United Kingdom ............... 8803705

[51] Int. Cl.⁵ .................... H01S 3/117; H01S 3/10
[52] U.S. Cl. ..................................... 372/13; 372/20
[58] Field of Search ............................ 372/9, 13, 20

[56] References Cited

U.S. PATENT DOCUMENTS

| | | | |
|---|---|---|---|
| 3,725,812 | 4/1973 | Scott | 372/13 |
| 3,749,476 | 7/1973 | Daly et al. | 372/13 |
| 4,057,770 | 11/1977 | Henningsen et al. | 372/13 |

FOREIGN PATENT DOCUMENTS

| | | |
|---|---|---|
| 114716 | 8/1984 | European Pat. Off. . |
| 0119786 | 6/1985 | Japan .................... 372/13 |
| 2207799 | 2/1989 | United Kingdom . |

OTHER PUBLICATIONS

Klann et al.; "Highly Stable Acousto-Optic Mode-Locking Using Active Feedback; Optics Comm."; vol. 38, Nos. 5,6; pp. 390-392.

Primary Examiner—William L. Sikes
Assistant Examiner—Georgia Y. Epps
Attorney, Agent, or Firm—Spencer & Frank

[57] ABSTRACT

An acousto-optic tunable filter, for laser tuning, comprises an acoustic transducer connected to one face of an anisotropic crystal or Bragg cell which is cut at such an angle relative to its optic axis that an acoustic wave projected into the crystal normal to the face causes wavelength-specific diffraction of an incident optic wave (from a laser amplifying element) which nearly, but not completely, satisfies the parallel-tangents phase matching condition, thus preserving a substantial angular field of view, the angle also being such that the diffraction is polarization-insensitive.

13 Claims, 3 Drawing Sheets

ACOUSTO-OPTIC TUNABLE FILTER

BACKGROUND OF THE INVENTION

1. Field of the Invention

This invention relates to acousto-optic tunable filters, especially those used for laser tuning.

2. Description of the prior art

Most types of acousto-optic tunable filter operate using the anisotropic acousto-optic interaction in an optically birefringent and uniaxial medium. This is the interaction between shear (transverse) acoustic waves and an incident optical wave, whereby a diffracted output optical wave has a different polarisation from that of the incident optical wave.

Our copending UK patent application no. 8718413 (U.K. Patent Application No. GB 2 207799A, published Feb. 8, 1989) discloses a tunable laser system comprising a laser cavity containing a laser amplifying element and an acousto-optic tunable filter of the type described above, the tunable filter consisting of a Bragg cell connected to a piezo-electric crystal. The piezo-electric crystal is supplied with an electrical signal from a noise generator by way of a variable frequency notch filter. The tunable filter causes Bragg diffraction of all the optical frequencies emitted from the laser amplifying element except light at the frequency required, which is allowed to pass undeflected and to return to the laser amplifying element.

SUMMARY OF THE INVENTION

As explained in greater detail below a sufficiently wide angular field of view for the tunable filter may be obtained by exploiting "parallel tangents" phase matching, a condition determined by the two refractive indices of the anisotropic medium and by the wave vectors of the acoustic wave and the incident optic wave. However, in most cases this type of acousto-optic tunable filter requires a polarised optical input in order for it to be wavelength-specific: in the general case, one acoustic frequency will diffract two different optical wavelengths if the input optical wave is unpolarised. The purpose of the present invention is therefore to provide an acousto-optic tunable filter with an adequate optical angular field of view which is polarisation-insensitive.

The invention provides an acousto-optic tunable filter comprising an acoustic transducer connected to one face of an anisotropic crystal cut at such an angle relative to its optic axis that an acoustic wave projected into the crystal normal to the said face causes wavelength-specific diffraction of an incident optic wave which nearly, but not completely, satisfies the parallel-tangents phase matching condition, thus preserving a substantial angular field of view, the said angle also being such that the said diffraction is polarisation-insensitive.

The function of an acousto-optic tunable filter, and one example of a tunable laser system embodying the invention, will now be described with reference to the accompanying diagrammatic drawings, which are not drawn to scale, in which:

Figure 1:
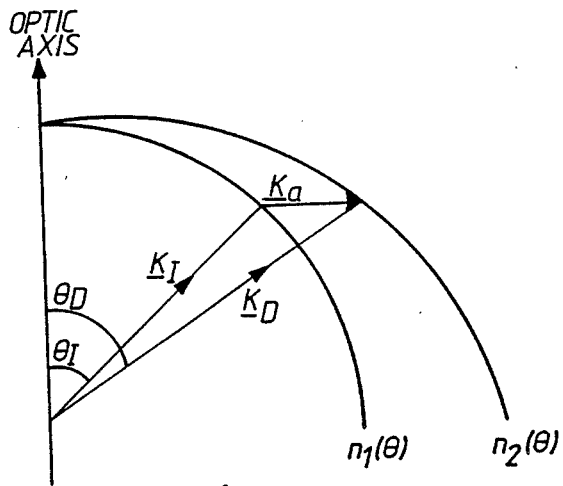
FIG. 1 is a phase matching diagram illustrating the anisotropic acousto-optic interaction.
Figure 2:
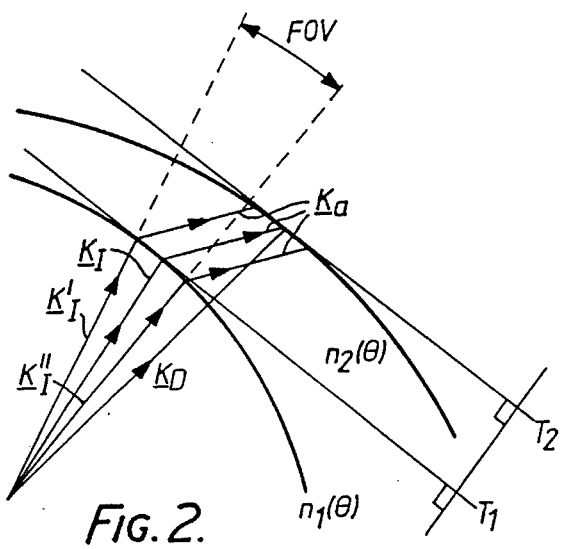
FIG. 2 is a phase matching diagram corresponding to FIG. 1 but illustrating the special case of parallel tangents phase matching.
Figure 3:
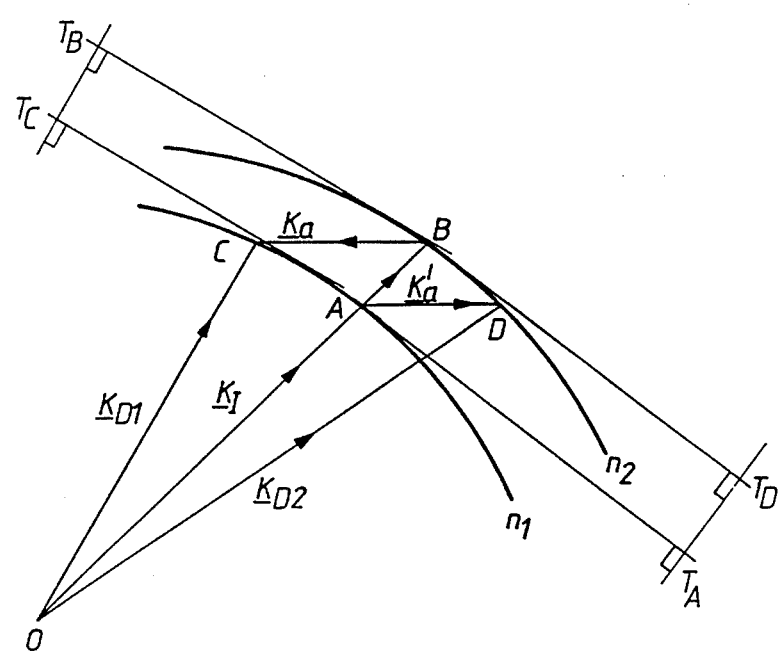
FIG. 3 is a phase matching diagram corresponding to FIG. 2 illustrating the conditions for diffraction of two different polarisation components of an incident optical wave.

The angles and relative dimensions in FIGS. 1 to 3 especially are greatly exaggerated for the purposes of illustration.

DESCRIPTION OF THE PREFERRED EMBODIMENT

FIG. 1 illustrates the anisotropic acousto-optic interaction in a Bragg cell of the type described above. The diagram represents one plane containing the optic axis and containing the incident optic wave vector $K_I$, the acoustic wave vector $K_a$, and the resultant wave vector $K_D$ of the diffracted wave. The lines $n_1(\theta)$ and $n_2(\theta)$ are the curves of intersection of this plane with the inner and outer refractive index ellipsoid surfaces respectively. The wave vectors satisfy the following equations:

$$K_I = \frac{2\pi n_1(\theta_I)}{\lambda_0}$$

$$K_d = \frac{2\pi n_2(\theta_D)}{\lambda_0}$$

and $$K_a = \frac{2\pi f_a}{v_a}$$

where:

$\lambda_0$ = free space wavelength of the optical wave which fulfills the phase matching condition for diffraction, $f_a$ = acoustic frequency, and $v_a$ = acoustic velocity of the acoustic beam propagating in the direction indicated.

In general, the dimensions of the two refractive index ellipsoid surfaces scale monotonically with decreasing wavelength, in the optical region of interest. It follows that a unique wavelength is selected by a given acoustic frequency $f_a$, provided that the acoustic and input optical propagation directions are fixed.

A large angular field of view for the input optical wave can be achieved in an acousto-optic tunable filter by exploiting parallel tangents phase matching, as shown in FIG. 2. For a given input wave vector $K_I$, there will be of course an infinite number of acoustic wave vectors which satisfy the phase matching condition by joining the two surfaces n1 and n2, but there will be one particular value (in the relevant quadrant) of the acoustic wave vector $K_a$ which connects points on the two index ellipsoid surfaces whose tangents T1 and T2 are parallel. This geometry ensures that the length of the acoustic vectors required to diffract a given wavelength of incident light are the same over a substantial input field of view (FOV), i.e. for incident wave vectors $K'_I$ to $K''_I$ of FIG. 2.

In general, this type of acousto-optic tunable filter requires a polarised optical input if it is to be wavelength-specific. As illustrated in FIG. 3, this is because the length of the acoustic vector required to diffract a given wavelength is dependent on the polarisation of the incident optical wave. For an incident wave of polarisation 1 (the "ordinary wave"), the wave vector OA will be diffracted to a wave vector $K_{D2}$ by the acoustic vector $K'_a$ such that the tangents $T_A$ and $T_D$ at points A and D are approximately parallel; and, similarly, the extraordinary wave OB diffracts to $K_{D1}$ with an acoustic wave vector $K_a$ such that the tangents $T_B$ and $T_C$ at points B and C are also approximately parallel to each other. The acoustic wave vectors are of course parallel, but not of equal length.

This means that the same acoustic frequency diffracts two possible optical wavelengths if the input wave is unpolarised or randomly polarised. It is possible to find optical input directions for which the magnitudes of $K_a$ and $K'_a$ are equal, but the required geometry would be impractical because either the acoustic frequency would be too high or the acousto-optic figure of merit would be too poor.

We have discovered that the tunable filter can be made polarisation insensitive, and thus capable of use with unpolarised or randomly polarised input light, by selecting the directions of the wave vectors such that they are rotated slightly away from the inclinations shown in FIG. 3 to the inclinations allowing the magnitudes of the acoustic wave vectors to be exactly equal. There is fortunately a sufficiently great tolerance in the parallel tangents phase matching condition to allow this small rotation to preserve a substantial input field of view. There is a reduction in the angular field of view because the phase matching geometry departs slightly from the ideal parallel tangents condition, but optical devices constructed such as to satisfy this polarisation insensitive condition are of great value.

Figure 4:
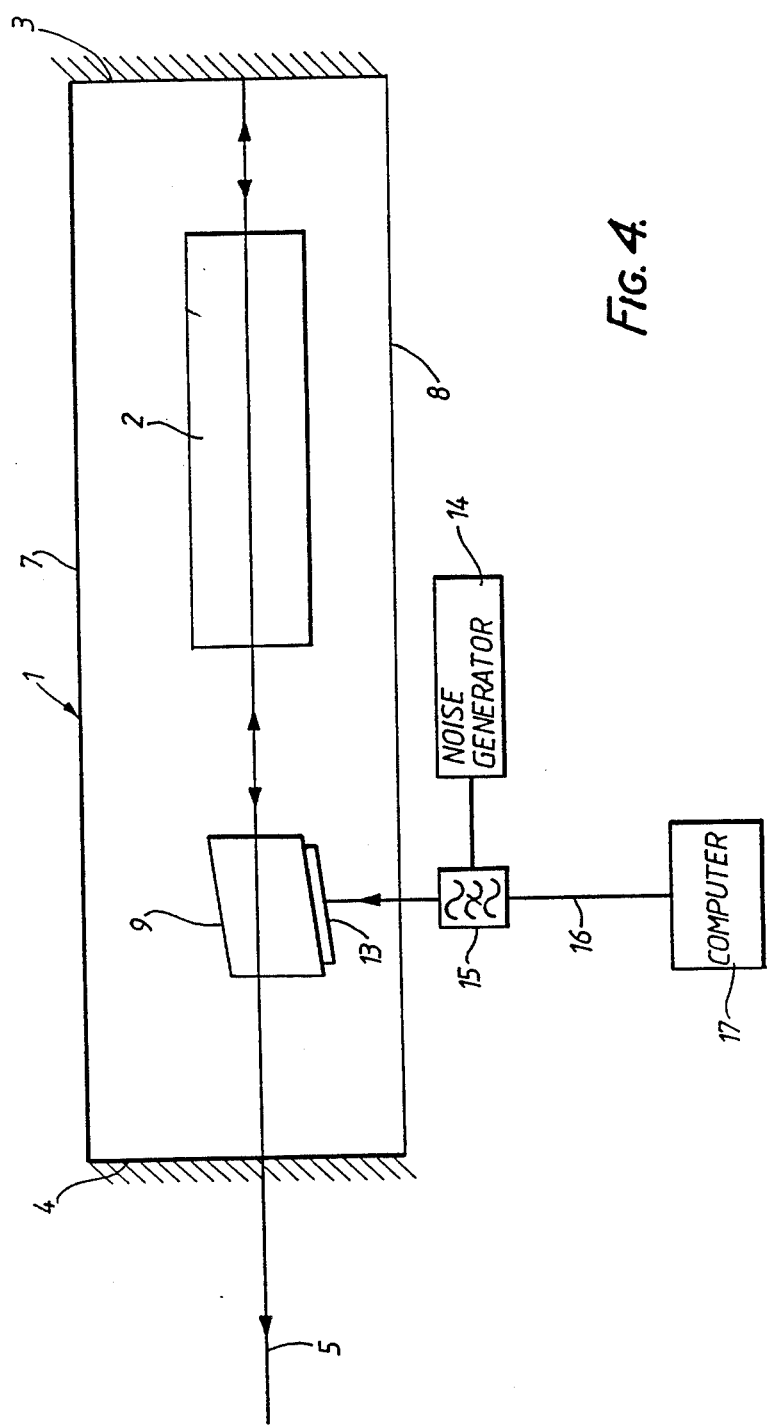
FIG. 4 is a schematic axial section through a tunable laser system embodying the invention.

A tunable laser system incorporating the invention described above with reference to FIG. 3 is shown in FIG. 4. The system is contained in a laser cavity 1 defined by a fully reflective surface 3 and a partially reflective surface 4. The laser cavity 1 contains a laser amplifying element 2 and an acousto-optic tunable filter comprising a Bragg cell 9 and a piezo-electric crystal transducer 13 on one of its faces, and has light absorbent side walls 7 and 8.

The Bragg cell 9 is arranged so that collimated light from the laser amplifying element 2 passing through it without Bragg diffraction will strike the partially reflective surface 4 at right angles, thus allowing repeated reflections between the reflective surface 3 and the partially reflective surface 4 through the laser amplifying element 2 and allowing laser action to produce emission of laser light 5.

Light from the laser amplifying element 2 which does undergo Bragg diffraction strikes the walls 7 and 8 either directly or after reflection from the partially reflective surface 4 and is absorbed.

The Bragg cell 9 has acoustic waves projected into it by the piezo-electric crystal 13. The piezo-electric crystal 13 is supplied with an electrical signal from a noise generator 14 via a variable frequency notch filter 15. The frequency of the notch filter 15 is controlled by a voltage on a line 16. This voltage is provided by a computer 17 setting the notch filter 15 to different frequencies in a prearranged sequence.

In operation the noise generator 14 supplies a "white noise" signal to the notch filter 15. The filter 15 removes one frequency from this noise so the piezo-electric element 13 is supplied with a signal having components at all frequencies except for the frequency removed by the notch filter 15. The piezo-electric element 13 then sends acoustic waves into the Bragg cell 9 at all frequencies other than the one removed by the notch filter 15.

In the Bragg cell 9 the acoustic waves interact with the unpolarised light from the laser amplifying element 2, in the manner described above with reference to FIG. 3, causing Bragg diffraction of all the light except for one frequency, this undeflected light being at the frequency that would be Bragg diffracted by acoustic waves at the frequency removed by the notch filter 15.

This undeflected light passes through the Bragg cell 9, and strikes the partially-reflective surface 4 at right angles. This light is then reflected back and forth between the partially reflective surface 4 and the reflective surface 3, passing repeatedly through the laser amplifying element 2 and being emitted through the partially-reflective surface 4.

The emitting frequency of the laser cavity 1 can be altered by changing the freuqency removed from the white noise signal by the notch filter 15.

The frequency removed by the notch filter is selected by a computer 17 which is pre-programmed with the sequence and timing of frequency shifts required. The computer 17 can be re-programmed if it needs to be given new instructions.

This system can alter the frequency of laser emission very rapidly: in a pulsed laser system it is possible to alter the frequency from pulse to pulse.

The white noise generator 14 could be replaced by a series of signal generators each producing a signal having a small range of frequencies, the generators' ranges of frequencies being arranged so that they overlap to produce a signal having frequency components at all frequencies that will cause Bragg diffraction of one of the laser amplifying element's emission frequencies. This 'comb' of R.F. tones could be arranged to omit the desired wavelength, thus avoiding the need for a filter.

Although the Bragg cell 9 has been described as being separate from the laser amplifying element 2 it would be possible to bond them together or form them monolithically as a single unit.

As disclosed in greater detail in copending U.K. Patent Application No. GB 2 207799A to which reference has already been made, the laser system may alternatively be arranged so that it is only the Bragg-diffracted wave from the tunable filter which is returned on the same optical path to the laser amplifying element 2. The frequencies of light other than the required frequency are then allowed to pass out of the laser cavity without amplification. The Bragg-diffracted wave may be returned for example by means of an inclined reflective surface positioned on the output side of the tunable filter.

We claim:
1. An acousto-optical filter comprising
   (a) an anisotropic crystal having an optic axis and a face;
   (b) an acoustic transducer connected to said face;
   (c) a signal generator for generating a signal having a plurality of frequencies;
   (d) means for applying said signal to said transducer, said transducer projecting an acoustic wave into said crystal in a direction normal to said face; and
   (e) means for directing an optical wave onto said crystal, the angle of said face relative to the optic axis of said crystal and the value of said signal being such that said acoustic wave causes wavelength-specific diffraction of said optical wave which nearly, but not completely satisfies the parallel tangents phase matching condition, whereby a substantial angular field of view for said optical wave is obtained, the angle of the face of said crystal also being such that said diffraction is polarization-insensitive.

2. An optical device comprising an acousto-optical filter according to claim 1, in which said means for directing an optical wave comprises a source of collimated unpolarized light.

3. An optical device comprising an acousto-optical filter according to claim 1 in which said means for directing an optical wave comprises a source of colliminated randomly polarized light.

4. A tunable laser comprising
   (a) a laser cavity including
      a lasing element, said lasing element being capable of amplifying light having a plurality of different frequencies;
      first and second reflective surfaces; and
      an optical path joining said first and second reflective surfaces, light being repeatedly reflected backwards and forwards between said first and second reflecting surfaces, said lasing element being situated in said optical path;
   (b) means for increasing the population inversion in said lasing element so as to stimulate emission of a beam of light therefrom; and
   (c) an acousto-optic tunable filter positioned in said optical path, said tunable filter comprising
      an anisotropic crystal having an optic axis and a face;
      an acoustic transducer connected to said face;
      a signal generator for generating a signal having a plurality of frequencies;
      means for applying said signal to said transducer, said transducer projecting an acoustic wave into said crystal in a direction normal to said face; and
      means for directing an optical wave onto said crystal, the angle of said face relative to the optic axis of said crystal and the value of said signal being such that said acoustic wave causes wavelength-specific diffraction of said optical wave which nearly, but not completely satisfies the parallel tangents phase matching condition, whereby a substantial angular field of view for said optical wave is obtained, the angle of the face of said crystal also being such that said diffraction is polarization-insensitive, only light of a wavelength which in the course of its passage through said filter is subjected to said wavelength-specific diffraction being returned to said lasing element.

5. A tunable laser as claimed in claim 4 in which said wavelength-specific diffraction consists of Bragg diffraction.

6. A tunable laser comprising
   (a) a laser cavity including
      a lasing element, said lasing element being capable of amplifying light having a plurality of different frequencies;
      first and second reflective surfaces; and
      an optical path joining said first and second reflective surfaces, light being repeatedly reflected backwards and forwards between said first and second reflecting surfaces, said lasing element being situated in said optical path;
   (b) means for increasing the population inversion in said lasing element so as to stimulate emission of a beam of light therefrom; and
   (c) an acousto-optic tunable filter positioned in said optical path, said tunable filter comprising
      an anisotropic crystal having an optic axis and a face;
      an acoustic transducer connected to said face;
      a signal generator for generating a signal having a plurality of frequencies;
      means for applying said signal to said transducer, said transducer projecting an acoustic wave into said crystal in a direction normal to said face; and
      means for directing an optical wave onto said crystal, the angle of said face relative to the optical axis of said crystal and the value of said signal being such that said acoustic wave causes wavelength-specific diffraction of said optical wave which nearly, but not completely satisfies the parallel tangents phase matching condition, whereby a substantial angular field of view for said optical wave is obtained, the angle of the face of said crystal also being such that said diffraction is polarization-insensitive, only light of a wavelength which in the course of its passage through said filter is not subjected to said wavelength-specific diffraction being returned to said lasing element.

7. A tunable laser as claimed in claim 6 in which said wavelength-specific diffraction consists of Bragg diffraction.

8. A tunable laser according to claim 4 comprising signal generating means, said signal generating means producing signals which tune said tunable filter to a selected one frequency from said plurality of frequencies.

9. A tunable laser as claimed in claim 8, wherein said signals produced by said signal generating means drive said tunable filter to produce acoustic waves in said anisotropic crystal at a plurality of acoustic frequencies, light from said lasing element generated at wavelengths other than said one frequency being subjected to Bragg diffraction.

10. An acousto-optical polarization-insensitive filter for operation with a tunable laser at a predetermined frequency, comprising
   an anisotropic crystal having an optic axis, a face cut at a predetermined angle with respect to said optic axis, and first and second spaced refractive index ellipsoidal surfaces, said first and second ellipsoidal surfaces having first and second respective points thereon at which tangents thereto are parallel to each other, a field of view being defined which includes portions of said first and second ellipsoidal surfaces adjacent said first and second points;
   an acoustic transducer coupled to the face of said anisotropic crystal;
   means for coupling an electrical signal having a plurality of frequencies, except for said predetermined frequency, to said acoustic transducer, said transducer projecting acoustic waves into said crystal in a direction normal to said face, said acoustic waves being represented by vectors of equal magnitude connecting portions of said first and second ellipsoidal surfaces adjacent said first and second points; and
   means for directing an optical wave onto said crystal in the plane of said optic axis within said field of view, said optical wave interacting with said acoustic waves over said field of view to cause wavelength-specific diffraction of said optical wave impinging on said first ellipsoidal surface over said angular range.

11. In combination with a laser including a laser cavity having spaced reflecting surfaces and an excited laser amplifying element positioned therebetween, a tunable laser system comprising an acousto-optical polarization-insensitive filter positioned within said laser cavity, said filter comprising an anisotropic crystal having an optic axis, a face cut at a predetermined angle with respect to said optic axis, and first and second spaced refractive index ellipsoidal surfaces, said first and second ellipsoidal surfaces having first and second respective points thereon at which tangents thereto are parallel to each other, a field of view being defined which includes portions of said first and second ellipsoidal surfaces adjacent said first and second points;

an acoustic transducer coupled to the face of said anisotropic crystal;

means for applying an electrical signal having a plurality of frequencies, except for said predetermined frequency, to said acoustic transducer, said transducer projecting acoustic waves into said crystal in a direction normal to said face, said acoustic waves being represented by vectors of equal magnitude connecting portions of said first and second ellipsoidal surfaces adjacent said first and second points; and means for directing an optical wave onto said crystal in the plane of said optic axis within said field of view, said optical wave interacting with said acoustic waves over said field of view to cause wavelength-specific diffraction of said optical wave impinging on said first ellipsoidal surface over said angular range.

12. A tunable laser system according to claim 11 wherein said means for applying an electrical signal to said acoustic transducer comprises a noise generator; and an electrical filter interposed between said noise generator and said acoustic transducer, said filter transmitting all frequencies generated by said noise generator to said acoustic transducer except a predetermined frequency at which said tunable laser operates.

13. A tunable laser system according to claim 12 wherein said electrical filter is a notch filter.

* * * * *